April 27, 1954

C. E. HITTLE 2,676,754

COUNTER GEAR SYSTEM

Filed Nov. 29, 1952

INVENTOR.
Carl E. Hittle
BY

ATTORNEY.

Patented Apr. 27, 1954

2,676,754

UNITED STATES PATENT OFFICE 2,676,754

COUNTER GEAR SYSTEM

Carl E. Hittle, North Hollywood, Calif., assignor to Radio Corporation of America, a corporation of Delaware Application November 29, 1952, Serial No. 323,224

6 Claims. (Cl. 235—91)

This invention relates to film advancing equipment, and particularly to a footage counter gear drive, which may be engaged and disengaged in accordance with the operation of the film advancing mechanism.

In the production of motion pictures, wherein the concomitant sound for the pictures is recorded on a separate sound track, and particularly on magnetic film which may be immediately played back, it has been found desirable to reverse the film and check on the recording at the end of certain sequences.

When this was done with prior equipments, it was necessary for the recordist to check his film footage counter, rewind the film to the beginning of the sequence, note the footage, and then check the footage counter when the sound film was played back in order to stop the film at the proper place to continue on for the next sequence. This required a certain amount of arithmetical calculations requiring time and involving the possibility of error. The present invention is directed to a device, which, when it is desired to reverse the film, the footage counter may be disconnected with visual and/or audible indications of the disconnection, the film reversed, and then advanced to the end of the sequence when the footage counter may be again connected to the film advancing mechanism at a mark previously placed on the film. This has been found to save time and prevent errors of the past.

The principal object of the invention, therefore, is to facilitate the recording of footage sequences during reversal of certain film sequences.

Another object of the invention is to provide an improved film footage counter.

A further object of the invention is to provide a film footage counter which may be readily disconnected from and connected to the film advancing mechanism, and which is provided with a visual and/or audible indication of the connection condition.

Figure 1:
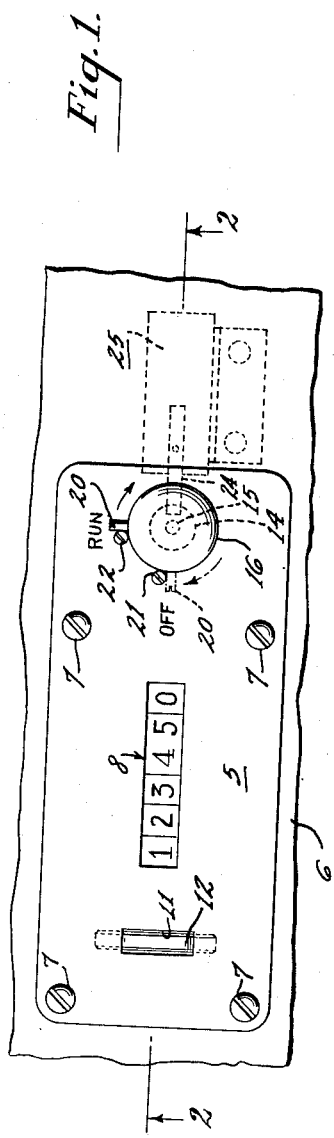
Figure 2:
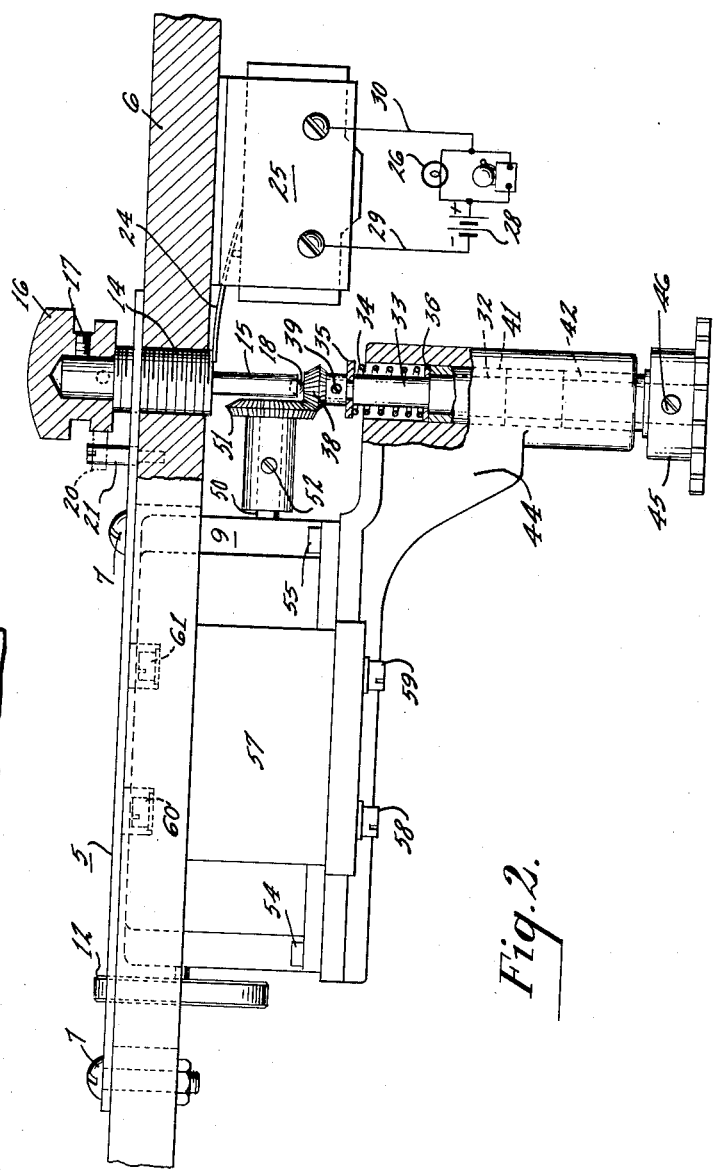

Although the novel features which are believed to be characteristic of this invention will be poitned out with particularity in the appended claims, the manner of its organization and the mode of its operation will be better understood by referring to the following description, read in conjunction with the accompanying drawings, forming a part hereof, in which:

Fig. 1 is a front elevational view of the panel showing the film footage counter indicia, and Fig. 2 is a cross-sectional view of the invention taken along the line 2—2 of Fig. 1.

Referring now to the drawings, in which the same numerals identify like elements, an escutcheon plate 5 mounted on a panel 6 by screws 7 has an opening through which the indicia 8 of a footage counter 9 is visible. Through an opening 11 in the plate 5 and panel 6, projects a hand wheel 12 for the purpose of manually setting the indicia 8 of the footage counter 9.

Threaded in the panel 6 by threaded section 14, is a shaft 15, on one end of which is mounted a hand knob 16 by set screw 17. On the other end of the shaft 15, is a ball bearing 18. Extending from the knob 16, is a projection 20 adapted to be rotated with the knob 16 and which stops the knob when the projection 20 abuts the screws 21 and 22 in the panel 6. When the knob is turned so as to move to its extreme axial position in one direction, it moves a lever 24 of a microswitch 25, which closes the switch contacts and energizes a lamp 26 and a bell 27 with energy from a battery 28 over conductors 29 and 30. When the shaft 15 is in its opposite extreme axial position, the contacts of switch 25 are opened and the lamp and bell de-energized.

In axial alignment with shaft 15, is a gear shaft 32 having, on the reduced diameter portion 33 thereof, a coil spring 34, one end of which abuts a shoulder 35, and the other end of which abuts a thrust washer 36. A gear 38 is fixed to one end of the shaft 32 by a screw 39. The shaft 32 is rotatable in bushings 41 and 42, which are pressed in the bore of bracket 44. A sprocket wheel 45 is mounted on the opposite end of shaft 32 from gear 38 and held thereon by set screw 46. Thus, the assembly of gear 38, shaft 32, and sprocket 45 is rotatable and also movable axially within the limits of the compression of spring 34. Spring 34 is unrestrained as to axial movement, since there is clearance between the spring and shaft and spring and bore. The assembly is driven by a suitable chain on sprocket 45 attached to the film advancing mechanism, not shown.

The footage counter 9 is driven by a shaft 50 on which is mounted a gear 51 by a set screw 52. The shaft 50 and the shaft 32 are at right angles to one another. The footage counter 9 is mounted on the bracket 44 by screw type fasteners 54 and 55, while bracket 44 is held on the panel 6 by spacer blocks, such as shown at 57, and mounting screws 58, 59, 60 and 61.

The footage counter gear engage and disengage mechanism and the signaling system therefor operate as follows. A sequence is first recorded with the footage being properly logged and identifying marks placed on the film at the start and end of the film sequence. The gears 38 and 51 are now disengaged by rotation of the knob 16 from the stop 22 to the stop 21, which moves gear 38 away from gear 51 and actuates the switch 25 to indicate the disengagement of the gears by energizing lamp 26 and bell 27. The film is then rewound to the start mark. The recorded sequence is then reproduced to check its quality or for other reasons. When the end of the sequence is reached, the film advancing mechanism is stopped, and the gears 38 and 51 are engaged at the end stop mark so that the footage counter continues to correctly log the following sequence. In this manner, no calculations or errors can be made in the logging of the beginning and end of the various sequences.

I claim:

1. A footage counter drive for a film advancing mechanism comprising a shaft driven from said mechanism, a gear mounted on said shaft, said shaft and gear being rotatable and movable axially, a coil spring surrounding said shaft and urging said shaft and gear in one axial direction, a gear normally in mesh with said first mentioned gear, said spring urging said gears in mesh, a footage counter driven by said second mentioned gear, an adjustable shaft in axial alignment and in contact with one end of said first mentioned gear shaft, means for rotating said adjustable shaft between predetermined limits, rotation of said adjustable shaft moving said adjustable and said first mentioned gear shaft axially against the tension of said spring to disconnect said gears.

2. A footage counter drive in accordance with claim 1, in which a signaling means and means connecting said adjustable shaft and said signaling means are provided, said signaling means being actuated by said adjustable shaft when in one extreme position and said gears are out of mesh.

3. A footage counter drive for a film advancing mechanism comprising a shaft connected to and driven by said mechanism, a spring surrounding said shaft and urging said shaft in one axial direction, a gear on the end of said shaft, a footage counter, a gear for driving said footage counter, said spring urging said gears in mesh, means for disengaging said gears against the tension of said spring, and means for indicating the engagement and disengagement of said gears, said first mentioned means including an axially movable shaft for said first mentioned gear and a second shaft in contact and in axial alignment and axially movable to move said first mentioned shaft to engage and disengage said gears.

4. A footage counter drive in accordance with claim 3, in which said last mentioned means includes a microswitch, visible and audible means, and means between said first mentioned means and said microswitch for actuating said switch and energizing said visible and audible means.

5. A footage counter drive for a film advancing mechanism comprising a panel, a footage counter mounted on said panel, a shaft for said footage counter parallel with the plane of said panel, a gear on the end of said shaft, a shaft at right angles to said footage counter shaft and perpendicular to said panel, a gear on said second mentioned shaft normally in mesh with said first gear, a coil spring surrounding said second mentioned shaft and urging said gears in mesh, means for rotating said second mentioned shaft from said film advancing mechanism, said second mentioned shaft being movable axially against the tension in said spring to disconnect said second mentioned gear from said first mentioned gear, a shaft through said panel in axial alignment and axially movable to move said second mentioned shaft, and a hand knob for axially moving said last mentioned shaft.

6. A footage counter drive in accordance with claim 5, in which connections between said switch and said second mentioned shaft are provided, movement of said second mentioned shaft in one direction actuating said switch.

References Cited in the file of this patent

UNITED STATES PATENTS

| Number | Name | Date |
| --- | --- | --- |
| 1,175,210 | Wessoleck | Mar. 14, 1916 |
| 1,336,586 | Rosendahl | Apr. 13, 1922 |
| 1,460,119 | Toney | June 26, 1923 |
| 1,461,956 | Wood | July 6, 1923 |
| 1,849,116 | Sperry | Mar. 15, 1932 |
| 2,103,650 | Spaunburg | Dec. 28, 1937 |